(12) United States Patent
Ungar et al.

(10) Patent No.: US 7,856,612 B1
(45) Date of Patent: Dec. 21, 2010

(54) LITHOGRAPHY MASK DESIGN THROUGH MASK FUNCTIONAL OPTIMIZATION AND SPATIAL FREQUENCY ANALYSIS

(75) Inventors: P. Jeffrey Ungar, Sunnyvale, CA (US); Ilhami H. Torunoglu, Monte Sereno, CA (US)

(73) Assignee: Gauda, Inc., Santa Clara, CA (US)

( * ) Notice: Subject to any disclaimer, the term of this patent is extended or adjusted under 35 U.S.C. 154(b) by 330 days.

(21) Appl. No.: 11/864,343

(22) Filed: Sep. 28, 2007

Related U.S. Application Data

(60) Provisional application No. 60/827,295, filed on Sep. 28, 2006.

(51) Int. Cl.
- *G06F 17/50* (2006.01)
- *G06F 19/00* (2006.01)
- *G06F 17/14* (2006.01)
- *G03F 1/00* (2006.01)
- *G21K 5/00* (2006.01)
- *G06K 9/00* (2006.01)

(52) U.S. Cl. ............... 716/21; 430/5; 378/35; 700/120; 700/121; 382/154; 382/144

(58) Field of Classification Search ............ 716/21; 430/5; 378/35; 700/120, 121; 382/154, 382/144

See application file for complete search history.

(56) References Cited

U.S. PATENT DOCUMENTS

| | | | |
|---|---|---|---|
| 5,124,927 A * | 6/1992 | Hopewell et al. | ........... 700/121 |
| 5,326,659 A | 7/1994 | Liu et al. | |
| 5,527,645 A | 6/1996 | Pati et al. | |
| 5,701,365 A | 12/1997 | Harrington et al. | |
| 6,518,180 B1 | 2/2003 | Fukuda | |
| 6,611,953 B1 | 8/2003 | Filseth et al. | |
| 7,063,920 B2 * | 6/2006 | Baba-Ali | ........... 430/5 |
| 7,266,803 B2 | 9/2007 | Chou et al. | |
| 7,286,284 B2 * | 10/2007 | Totzeck et al. | ........... 359/363 |
| 7,328,425 B2 * | 2/2008 | Olsson et al. | ........... 716/21 |
| 7,546,574 B2 * | 6/2009 | Torunoglu et al. | ........... 716/19 |
| 7,585,596 B1 * | 9/2009 | Johnson et al. | ........... 430/5 |
| 7,589,819 B2 * | 9/2009 | Baba-Ali | ........... 355/53 |
| 2004/0229130 A1 * | 11/2004 | Baba-Ali | ........... 430/5 |
| 2004/0252870 A1 * | 12/2004 | Reeves et al. | ........... 382/128 |

(Continued)

OTHER PUBLICATIONS

U.S. Appl. No. 11/864,381 Prosecution History, filed Sep. 28, 2007, now issued as U.S. Patent No. 7,716,627, available via USPTO IFW (including office actions, notice of allowance, references cited to date considered by examiner).

(Continued)

*Primary Examiner*—Phallaka Kik
(74) *Attorney, Agent, or Firm*—Aka Chan LLP

(57) ABSTRACT

In an electronic design automation technique for optical proximity correction, a mask is represented by a function with an exact analytical form over a mask region. Using the physics of optical projection, a solution based on a spatial frequency analysis is determined. Spatial frequencies above a cutoff are determined by the optical system do not contribute to the projected image. Spatial frequencies below this cutoff affect the print (and the mask), while those above the cutoff only affect the mask. Frequency components in the function below this cutoff frequency may be removed, which will help to reduce computational complexity.

9 Claims, 4 Drawing Sheets

Some pixel transmission values are marked

U.S. PATENT DOCUMENTS

2005/0068509 A1* 3/2005 Latypov et al. .............. 355/67
2006/0236295 A1* 10/2006 Baba-Ali .................... 716/19
2006/0248495 A1 11/2006 Sezginer
2007/0031745 A1 2/2007 Ye et al.
2007/0124708 A1 5/2007 Torres Robles et al.
2007/0130559 A1* 6/2007 Torunoglu et al. ........... 716/19
2007/0198963 A1 8/2007 Granik et al.
2008/0046846 A1 2/2008 Chew et al.
2008/0127031 A1* 5/2008 Olsson et al. ................ 716/21
2009/0075183 A1 3/2009 Cecil
2009/0245618 A1* 10/2009 Torunoglu et al. .......... 382/144

OTHER PUBLICATIONS

Office Action mailed Apr. 7, 2009 of U.S. Appl. No. 11/864,381, filed Sep. 28, 2007, now U.S. Patent No. 7,716,617.
Notice of Allowance mailed Dec. 24, 2009 of U.S. Appl. No. 11/864,381, filed Sep. 28, 2007, now U.S. Patent No. 7,716,617.

* cited by examiner

Mask transmission function

LITHOGRAPHY MASK DESIGN THROUGH MASK FUNCTIONAL OPTIMIZATION AND SPATIAL FREQUENCY ANALYSIS

CROSS-REFERENCE TO RELATED APPLICATION

This patent application claims the benefit of U.S. provisional patent application 60/827,295, filed Sep. 28, 2006, which is incorporated by reference along with all other references cited in this application.

BACKGROUND OF THE INVENTION

This invention relates to the field of electronic design automation, and in particular, the optimization of masks used for photolithographic printing of circuit designs, known in the field as optical proximity correction.

Production-scale chip manufacturing uses photolithographic techniques to build up layers of materials on a wafer to create the transistors, wires, and so on, that realize a chip design. The sizes of the features to be printed on the wafer are approaching the limits set by the wavelength of the light, the optical projection system, and the behavior of the light sensitive materials used, among many other factors.

Diffraction effects from the wavelength of the light source and the limits of the projection optics motivated the development of optical proximity correction (OPC) techniques to adjust the shapes on the mask to print more like the desired result on the wafer. For example, a square may have serifs added to its corners to compensate for excessive rounding of the corners of the printed feature, or the ends of a rectangle may have "hammerheads" added to further ensure the printed feature reaches the desired line end.

The first OPC methods were based on simple rules for modifying the shapes on the mask, but as the technology was pushed closer to optical resolution limits, model-based optimization, which adjusts the features on the mask to improve the calculated printed image, was developed. Two significant advantages of model-based OPC are the ability to account for proximity effects (warping a nearby feature will affect how a given feature prints) and to accommodate photoresist behavior.

Sometimes, features are found to print with greater fidelity if extra features are added to the mask that are too small to print themselves, but nevertheless favorably affect the way nearby main features print, especially over a range of process conditions. Introduction of these so-called subresolution assist features (SRAFs) is still generally done according to preset rules. Typically they are inserted first and held fixed as OPC is applied to the main features on the mask.

There are significant problems in applying these methods as the industry moves to ever smaller on-wafer dimensions. The rules used to insert SRAFs are becoming more complex and less reliable. The standard OPC methods do not have the flexibility needed to achieve the best results and require post-OPC verification and manual intervention.

What is needed is a practical model-based method for mask design that can automatically determine a mask that both satisfies mask manufacturing and verification criteria, and produces the desired print on the wafer over a range of process conditions, such as exposure and focus variation. Such a method will generally result in a mask that warps existing layout geometry and adds or subtracts SRAFs from anywhere, including in ways that split or join the layout features.

BRIEF SUMMARY OF THE INVENTION

Model-based OPC and more general "inverse lithography" methods are both iterative optimization algorithms that adjust parameters defining the mask until the predicted print is within acceptable tolerances for a set or range of conditions. They differ chiefly in how the mask is represented, which is typically as simple geometry for OPC, and as pixels comprising an image of transmission values for "inverse lithography".

Unless the mask representation automatically satisfies all desired mask constraints and characteristics, such as allowed transmission values or minimum feature size, the formula measuring a mask's suitability will introduce terms that add a cost related to the violation of these constraints. In field of "inverse problems", introducing these terms is known as "regularization", and is a means of selecting a solution from a potentially infinite set of solutions that fits the desired outcome equally or similarly well but also has other a priori desirable properties.

This invention advantageously and most generally represents the mask as a function with an exact analytical form over the mask region. Furthermore, the present invention uses the physics of optical projection to design the solution based on a spatial frequency analysis. From a physics perspective, spatial frequencies above a cutoff determined by the optical system do not contribute to the projected image. Spatial frequencies below this cutoff affect the print (and the mask), while those above the cutoff only affect the mask.

In some embodiments of the present invention, the mask function is expressed in a Fourier basis, which exposes perfectly the separation between the low frequencies that affect the print and the high frequencies that only adjust the mask. In other embodiments, different basis sets, such as wavelets, may be used that expose this frequency separation to a lesser degree.

The present invention expresses the desirability of a given mask function as a functional (a mathematical form that is a function of a function over a defined region) that calculates the "cost" with respect to the predicted printed image and possibly various a priori mask constraints. Since the present invention expresses the mask with an exact analytical form, the cost and its functional derivatives can be evaluated analytically and consistently, which enables the use of efficient cost minimization algorithms.

In one embodiment, the invention first determines a band-limited continuous-tone mask function that is clamped through regularization to the minimum and maximum allowable mask values, and then proceeds to determine a mask quantized to the allowable values that is consistent with this mask through further regularization of the solution. The frequency cutoff used may be higher than the optical cutoff to accommodate clamping and quantization and may change as the optimization proceeds.

The purpose of the clamping, which may be "soft" in that small excursions outside the range are allowed, is both to accommodate the kind of mask being designed and to avoid unphysical values that would imply amplification. For both clamping and mask value quantization, regularization terms are incorporated into the cost functional in a manner familiar to one skilled in the art. Their effect and their specific form may be adjusted on any schedule during the course of the optimization.

In an embodiment, the quantized optimal mask is decomposed into geometric shapes for further regularization to satisfy various geometric constraints. The shapes thus determined may appear as perturbed idealized mask shapes with extra features added or removed (SRAFs), or more generally as a pattern without a simple correspondence to the ideal target layout pattern.

In an embodiment, the spatial locality of the optical projection process is used in addition to the frequency locality to enable the decomposition of a full mask into overlapping tiles in which the cost functional and functional derivatives may be evaluated in a manner consistent with handling the entire mask at once.

In an embodiment, the invention is a method including: partitioning a layout mask into a plurality of regions, each region comprising geometric shapes; generating a two-dimensional pixel representation of a region; generating a analytical function (e.g., Fourier basis function) to represent the pixel representation of the region; performing a transformation on the analytical function to obtain a frequency space representation of the analytical function of the region; and based on the frequency space representation, removing low frequency components of the analytical function of the region.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
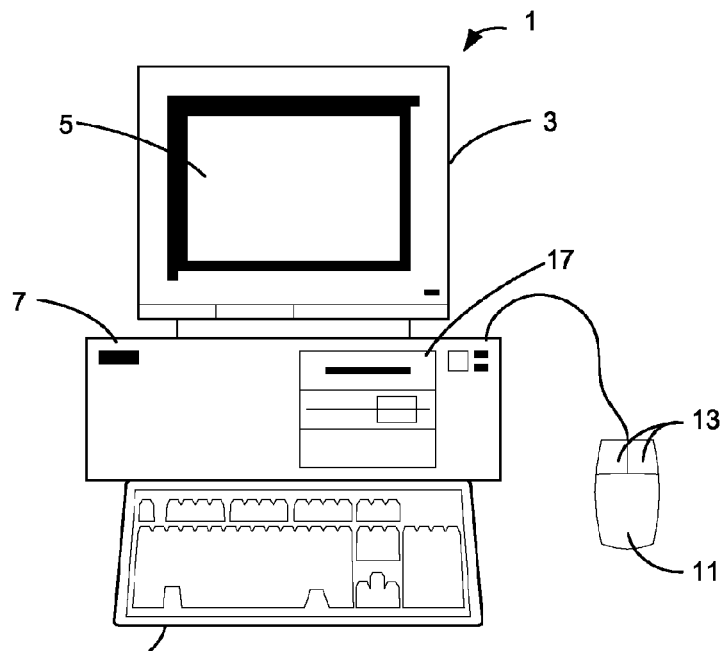
FIG. 1 shows a system of the present invention for performing electronic design automation using a graphics processor.

FIG. 1 shows a system of the present invention. In an embodiment, the invention is software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor, memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
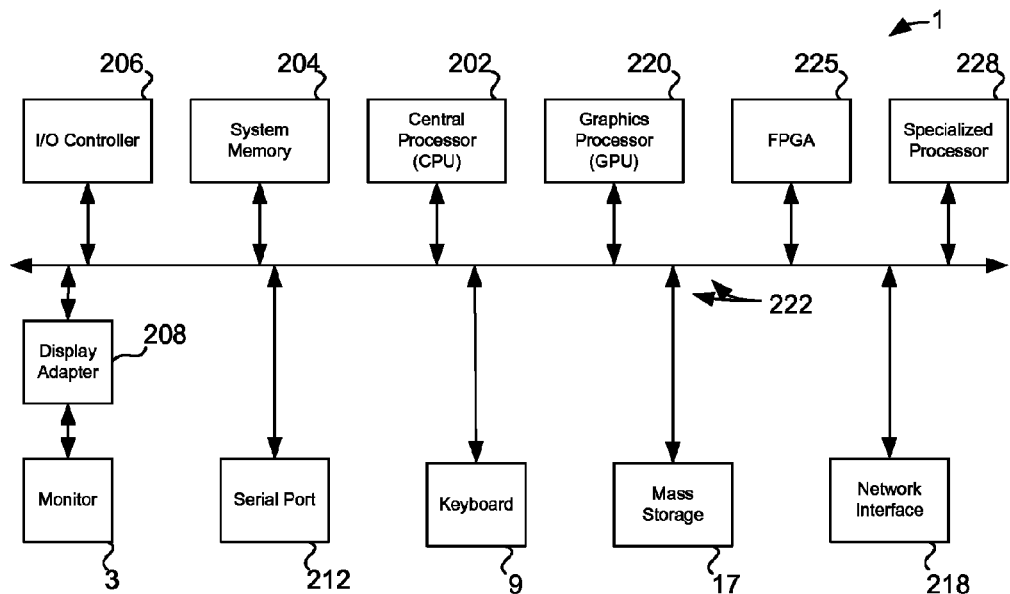
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor (CPU) 202, system memory 204, input/output (I/O) controller 206, display adapter 208, serial or universal serial bus (USB) port 212, network interface 218, graphics processor (GPU) 220, FPGA 225, and specialized processor 228 (e.g., ASIC, physics processor). The invention may also be used with computer systems with additional or fewer subsystems. For example, a computer system could include more than one processor 202 or 220, or both. Such a system may be referred to as a multiprocessor system. The system may include on-chip or external cache memory.

The computer system may include any number of graphics processors. The graphics processor may reside on the motherboard such as being integrated with the motherboard chipset. One or more graphics processors may reside on external boards connected to the system through a bus such as an ISA bus, PCI bus, AGP port, PCI Express, or other system buses. Graphics processors may on separate boards, each connected to a bus such as the PCI Express bus to each other and to the rest of the system. Further, there may be a separate bus or connection (e.g., Nvidia SLI or ATI CrossFire connection) by which the graphics processors may communicate with each other. This separate bus or connection may be used in addition to or in substitution for system bus.

Each processor, CPU or GPU, or both, may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MatLab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Mask Design Through Inverse Lithography with Spatial Frequency Analysis

Production-scale chip manufacturing uses photolithographic techniques to build up layers of materials on a wafer to create the transistors, wires, and so on, that realize a chip design. The sizes of the features to be printed on the wafer are approaching the limits set by the wavelength of the light, the optical projection system, and the behavior of the light sensitive materials used, among many other factors.

Diffraction effects from the wavelength of the light source and the limits of the projection optics motivated the development of optical proximity correction (OPC) techniques to adjust the shapes on the mask to print more like the desired result on the wafer. For example, a square may have serifs added to its corners to compensate for excessive rounding of the corners of the printed feature, or the ends of a rectangle may have "hammerheads" added to further ensure the printed feature reaches the desired line end.

The first OPC methods were based on simple rules for modifying the shapes on the mask, but as the technology was pushed closer to optical resolution limits, model-based optimization, which adjusts the features on the mask to improve the calculated printed image, was developed. Two significant advantages of model-based OPC are the ability to account for proximity effects (warping a nearby feature will affect how a given feature prints) and to accommodate photoresist behavior.

Sometimes, features are found to print with greater fidelity if extra features are added to the mask that are too small to print themselves, but nevertheless favorably affect the way nearby main features print. Introduction of these so-called subresolution assist features (SRAFs) is still generally done according to preset rules. Typically they are inserted first and held fixed as OPC is applied to the main features on the mask.

There are significant problems in applying these methods as the industry moves to ever smaller on-wafer dimensions. The rules used to insert SRAFs are becoming more complex and less reliable. The standard OPC methods do not have the flexibility needed to achieve the best results and require post-OPC verification and manual intervention.

What is needed is a practical model-based inverse lithography method that can automatically determine a mask that both satisfies mask manufacturing and verification criteria, and produces the desired print on the wafer over a range of process conditions, such as exposure and focus variation. Such a method will generally result in a mask that warps existing layout geometry and adds or subtracts SRAFs from anywhere, including in ways that split or join the layout features.

Typically, inverse lithography methods have pixelized the mask transmission values. The mask pixels are then adjusted to optimize the computed print in the photoresist as well as some measure of mask design "goodness." For example, the mask pixel values may be constrained to be fully transmitting (1) or absorbing (0) to produce a chrome-on-glass binary mask, or if not fully constrained, the optimization procedure may be tuned to strongly favor these values. In the field of inverse theory, directing the solution to have desired a priori characteristics is known as regularization. Other regularization terms are often employed to affect the solution, such as measures that penalize complex structures.

In contrast to pixel-based methods, this invention represents the mask as a continuous function and uses the physics of optical projection to design the inverse solution based on a spatial frequency analysis. From a physics perspective, spatial frequencies above a cutoff determined by the optical system do not contribute to the projected image.

Frequencies below this cutoff affect the print (and the mask), while those above the cutoff only affect the mask.

We represent the mask in a basis set that automatically exposes the separation between the low frequencies that affect the print and the high frequencies that only adjust the mask. The plane wave (Fourier) basis makes this separation perfectly, but other basis sets such as wavelets may be used.

The first stage in optimizing the mask function seeks a continuous tone solution that is clamped to the minimum and maximum allowable mask values. For a binary mask, this means that a regularizing cost functional is added to a functional that measures the goodness of the predicted printed features to prevent the mask values from straying outside of the interval [0, 1]. We include spatial frequencies up to some multiple of the cutoff to accommodate this clamping.

The output of this stage will have produced an optimal clamped solution for the various criteria included in the fitting functional. These may include terms that measure variation with exposure (dose), depth of focus, or that weight different parts of the printed image according to the needs of the design.

The solution obtained needs to be pushed further to be quantized to the allowable mask values, such as 0 and 1 for a binary mask. This is accomplished through another idea.

Mask design through "inverse lithography" using separation of spatial frequencies to control printed image versus mask manufacturability.

Typical inverse lithography methods pixelize the computed aerial image and the mask values under optimization on a dense spatial grid. The mask pixel values are adjusted to optimize both the computed print in the resist and some measure of mask "goodness" (which is known as regularization in "inverse theory"). For example, the mask transmission values may be constrained to be 0 or 1, or at least strongly favor these values in a solution, or a measure of the solution's complexity may be minimized to avoid complex, "snowflake" structures.

The regularization is used because the inverse problem (what mask will print a desirable image) is severely under-constrained—many masks will print essentially the same image, so other criteria must be used to select appropriate solutions. From a physics perspective, spatial frequencies above a cutoff determined by the optical system do not contribute to the projected image; therefore, frequencies below this cutoff affect the print (and the mask), while those above only affect the mask.

A computer-implemented method of the invention includes: representing the mask values in different basis sets with a view to exposing automatically the separation between the low frequencies that affect the print and the high frequencies that only adjust the mask. The Fourier basis provides the separation perfectly, but others such as various wavelet representations can be used.

A given (desirable) printed image must result from a band-limited aerial image (which is all the optical system can form), but there may be many such images that would work. The method regularizes this reduced solution further by favoring real-space mask pixels with values in (0.1), wider "process windows" (solution sensitivity to exposure and defocus), and so forth.

Taking the forward view, the system will print from a band-limited aerial image, so one may preprocess the ideal resist print (round the corners, and so forth) to be a better match to what is achievable to begin with, and actually construct an aerial image to achieve.

In either case, the high frequency coefficients may then be adjusted while holding the low frequency values constant or otherwise forced close to their original values to optimize the mask manufacturability.

Quasi-Static Regularization for Mask Manufacturability

Continuous-tone mask functions that solve the inverse lithography problem are quantized to allowable values; for example, 0 or 1 for a binary chrome-on-glass mask.

Starting with an optimized mask function, such as a continuous tone, clamped solution utilizing another invention, we slowly mix in a new cost functional to further regularize the solution. The mixing in may be done "quasi-statically" to bring the cost functional and the mask from pure goodness-of-fit to printed layout and process characteristics to pure manufacturability by keeping the total cost functional minimized step-by-step. The aim of this gradual mixing in is to do thermodynamically optimal work on the mask function to bring it to manufacturable values.

The functional we mix in to push the intermediate mask values to the allowable values may depend on the mask itself in some fixed, self-consistent, or otherwise changing way. The idea is that any value not close to an allowed value needs to move away from where it is without any particular bias as to which direction it goes.

One way to accomplish this is for the new cost functional term to place an energy maximum locally at intermediate current mask values to cause them to "roll" downhill towards an allowed value on either side of the hill. The new functional can also favor allowed values by having local minima at these values. Intermediate mask values very close to an allowed value may instead be pushed toward the nearest allowed value by placing the hill on the far side.

By doing multiple steps where the quantizing functional becomes a larger fraction of the total cost functional and where the hills placed underneath intermediate values are adjusted to chase them to any allowed value, the mask function is brought to quantized values in a controlled and optimal way.

A computer-implemented method of the invention includes: Start with optimized mask (perhaps continuous tone and phase, pixelized, or otherwise parameterized). Mix in a new cost to "regularize" the solution to be more desirable (e.g., to favor a binary mask, or others). Conceptually, adjust the mixing quasi-statically to bring the functional from pure goodness-of-fit to printed layout to pure manufacturability, keeping the total cost functional minimized step-by-step.

An objective is to do thermodynamically optimal (reversible) "work" on the solution to adjust to manufacturabilty.

Use spatial frequency separation described above to advantage.

Inverse Lithography with Simplified Resist Model to Generate Assist Features for Traditional Model-Based Optical Proximity Correction Inverse lithography methods generally require substantial computing resources and may generate smooth, curvy features that need to be converted to rectilinear mask geometry. Traditional model-based OPC is fast and can use more sophisticated resist models, but cannot generate subresolution assist features (SRAFs) automatically and self-consistently.

Take a mask function optimized through inverse lithography, and use it as input to a traditional model-based OPC program. The inverse lithography process will provide the SRAFs and initial shapes, and the traditional OPC program can further correct and validate the results using better models.

A computer-implemented method of the invention includes: Use a simplified resist model that has an analytical functional form to do inverse modeling faster, but take the resulting mask (after modifying to be a set of shapes as for binary, PSM, EAPSM, or others, manufacturable masks), and optimize it using a traditional OPC program with a more complex resist model.

In this way, the extra mask features needed to print well are generated by the inversion, but then further corrected and validated by a program with access to better models (which may take more computational effort to use).

Fast Eigenfunction Decomposition of the Real Space Partially Coherent Transmission Operator using High Resolution Fourier Space Grids Calculating projected images with partially coherent illumination can be done efficiently using an eigenfunction expansion of the Hopkins partial coherence operator. This expansion can be accomplished in real space or Fourier space. A naïve discretization of the illumination source and coherent transfer function of the optical projection system followed by matrix diagonalization is likely to be both inaccurate and computationally intensive, even if iterative, large-scale diagonalization schemes are used.

In this invention, we super-sample the illumination source and the coherent optical transfer functions in Fourier space to represent slim or circular shapes more accurately. We may also smooth the transition at the edges of these shapes to further symmetrize the calculated real space samples.

To accelerate the diagonalization of the real-space Hopkins partial coherence operator, we use the translational invariance of the mutual intensity illumination function to compute the matrix-vector product via element-wise multiplication and Fast Fourier Transforms (FFTs). To determine the eigenvectors with the largest eigenvalues (greatest contribution to the operator), only matrix-vector products are needed by solvers such as SVDPACK or ARPACK.

The operations count (when discretizing space on an n by n grid) for the matrix-vector product is reduced from $O(n^4)$ to $O(n^2 \log(n^2))$.

Representation and decomposition of the partially coherent transmission matrix in real-space with the effective source mutual intensity and the coherent amplitude point-spread transfer function represented on a high-resolution grid in Fourier space. A computer-implemented method of the invention includes:

1. Represent quantities on a real-space 2D grid (nx by ny). Transmission matrix will be on a (nx*ny) by (nx*ny) real space grid, assuming we flatten the 2D space to a single index. Diagonalize this (Hermitian) matrix to decompose (goal is to keep largets eigenvalue vectors only). Eigenvectors so obtained are the real-space "kernels."

The computational effort to do the diagonalization (or singular value decomposition) increases quickly with real-space grid resolution, being $O((nx*ny)^3)$. The resolution needed for a good representation is not too high, however, with n=nx=ny=64 being adequate and requiring only minutes to diagonalize.

2. The real-space transmission matrix is

T(r1,r2)=J0minus(r1,r2)*K(r1)*conjugate(K(r2))

J0minus(,) is mutual intensity just before the mask

K( ) is coherent amplitude transfer function r1, r2 coordinates of two real-space points.

It is typical for J0minus(r1,r2) to be a function of r1-r2 only (translational invariance). These quantities are conveniently specified in Fourier space; e.g., F{K} ( ) is generally a (circular) low pass filter, and F{J0minus}( ) is essentially the illumination pattern (Kohler, Annular, QUASAR, or others).

These slim or circular shapes, or both, are represented on a square grid with enough resolution to capture their essential characteristics, but not exceed the transmission matrix diagonalization. One technique is to use a Fourier space grid that has many times more samples than the target real-space grid (while retaining the same frequency extents). This effectively just embeds the result in a real-space grid with larger extents, so the needed values are obtained by inverting the fine-Fourier-grid samples to real-space, and then retaining only the values within the target real-space grid cell.

If the Fourier-space grid resolution is an integral factor times greater, then after inversion the real-space values within the target real-space grid cell will lie on the target real-space grid points.

Light Source Optimization

The characteristics of the light source in a photolithography projection system have a significant effect on the quality of the resulting images printed on the wafer. These parameters may be optimized to print certain layers.

According to the invention, there are various approaches:

(1) Optimize a set of orthonormal functions and eigenvalues constrained to represent a valid Hopkins partial coherence operator to optimize the illumination source.

(2) Instead, optimize the mutual intensity function directly in Fourier space or real space taking advantage of small perturbations yielding small variations in any eigenfunction decomposition.

(3) Optimize the light source directly using Abbe's method of statistically independent ray bundles.

A computer-implemented method of the invention includes: Optimize the orthonormal kernels and singular values defining a sparse decomposition of the TCC matrix (in real or Fourier space).

Optimize the incident mutual intensity directly. Take advantage of small variations in J yielding small variations in TCC or intensity, or both.

Optimize source light distribution directly and formulate partial coherence via Abbe's method of statistically independent ray bundles.

Use spatial frequency separation described earlier to advantage.

Mask Functional Optimization and Spatial Frequency Analysis

Figure 3:
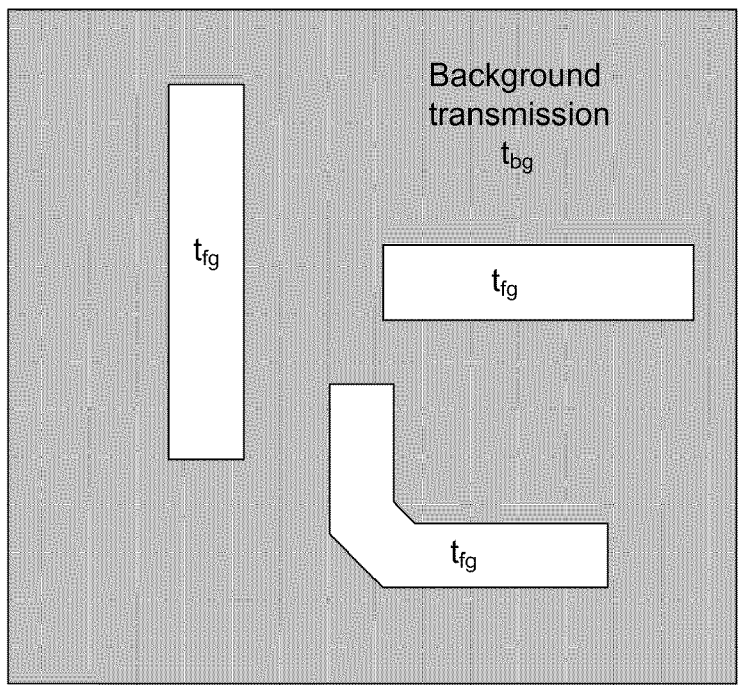
FIG. 3 schematically shows a mask represented by simple geometric shapes.

In the field of optical proximity correction, a mask for photolithography is typically represented as geometric shapes of a foreground transmission value set against a backdrop with a background transmission value. FIG. 3 shows this representation schematically. The foreground transmission values need not all be the same, but they will be fixed to values allowed by the mask technology, and the geometric shapes may be more general than those illustrated. The fundamental limitation is that new shapes cannot be systematically introduced during the course of mask optimization.

More general "inverse" lithography methods have typically represented a mask as an image of pixels with transmission values, as shown in FIG. 3. In this case, it is the pixel values that are adjusted, which will construct a mask with many intermediate transmission values that must be "regularized" to assume only the allowed values. Moreover, a consistent calculation of the projected intensity and any derived quantities requires integrations over each piecewise constant pixel area, and this is usually neglected since it may be too computationally intensive.

Figure 5:
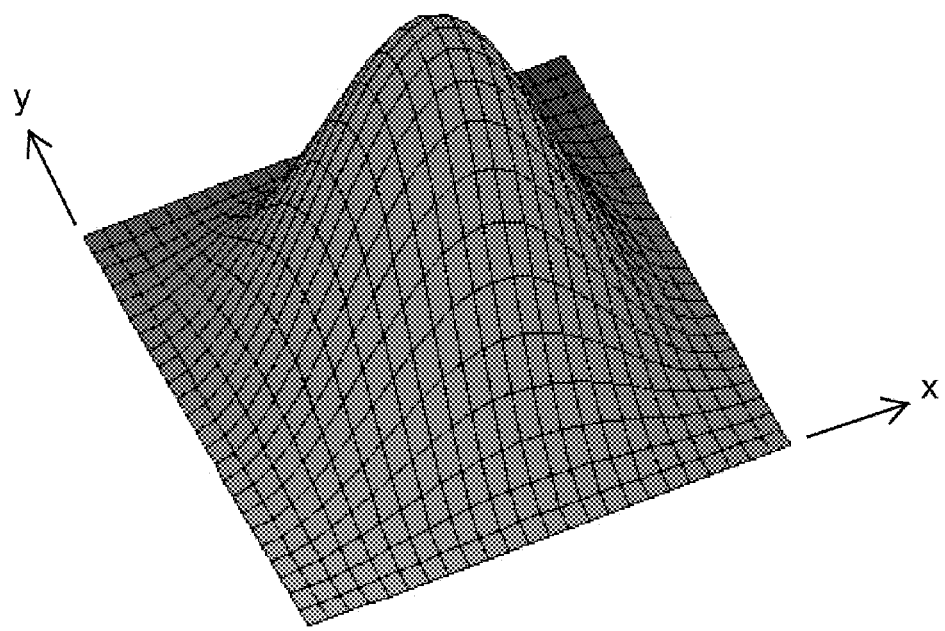
FIG. 5 schematically shows a mask represented as a general function giving the mask transmission over the mask area.

The present invention represents a photolithography mask as a function with a specific mathematical form that evaluates to the mask transmission value over the mask area (see FIG. 5). Using a specified mathematical form permits consistent and efficient evaluation of functionals of the mask that compute the cost of a mask function with respect to fitting a desired printed target pattern, or to satisfying a priori criteria a mask function should meet to be acceptable. (Instead of "cost," "energy," "merit," or other terms familiar to one skilled in the art may be used to describe such functionals.) This consistency enables the use of fast optimization algorithms that rely on derivative information.

The physics of the optical projection process shows that only spatial frequencies in the mask function up to a cutoff can contribute to the final image. For example, for a system using a quasi-monochromatic light source with wavelength $\lambda_0$, an extended source shape that is a disk (known as Kohler illumination) with partial coherence factor $\sigma$, and image-forming optics with numerical aperture NA, only spatial frequencies present in the mask function up to $$f_{cut} = \frac{NA}{\lambda_0}(1+\sigma)$$

can contribute to the projected image. (The image itself is quadratic in the mask function and so contains frequencies up to $2f_{cut}$.)

The mask function, as well as other functions such as the image intensity, and so on, may be expressed mathematically in terms of a basis set. Desirable basis sets may exploit locality in the frequency or spatial domains depending on the needs of a specific calculation, but in any case should permit exact results to be calculated within any other approximations applied. One useful basis set that may be employed to exploit the frequency cutoff is a Fourier basis. For example, conceptually the mask function and the projected intensity may be written as $$m(r) = \sum_f \tilde{m}(f) e^{i2\pi f \cdot r}$$

$$I(r) = \sum_f \tilde{I}(f) e^{i2\pi f \cdot r}$$

and the band-limited nature of the intensity and of the mask that is "seen" by the optics may be made explicit by restricting the sums to $|f| \leq f_{max}$ for some selected $f_{max}$.

In an embodiment, the maximum frequency used to represent the mask may be greater than the optics cutoff. Furthermore, an embodiment need not parameterize band-limited functions describing the mask, intensity, or other quantity of interest explicitly in terms of its Fourier coefficients provided complete consistency is maintained between real space and Fourier space samples. More generally, an embodiment that uses other basis sets will ensure such consistency is maintained.

To formulate the mask design task as a functional optimization problem, the present invention defines a "cost" or "energy" functional that compares the predicted printed pattern to a target layout over the entire mask area. In a very general way, the total cost may be expressed as $$E = \int d^2 r \, \epsilon[m(r), p(r)]$$

where $m(r)$ is the mask function, $p(r)$ is the target pattern, and $\epsilon$ is an energy density that is a functional of the mask and target pattern functions. In an embodiment, the form of the energy density may contain terms that are not simple local functions of the mask and target pattern. These may include but are not limited to convolutions of the mask or target pattern with filter functions and various spatial derivatives.

An optimal mask will have a cost that is stationary with respect to small variations in the mask function. To first order in the variation $$\delta E = \int d^2 r \frac{\delta \epsilon}{\delta m(r)} \delta m(r) = 0$$

where $\delta\epsilon/\delta m(r)$ is the functional derivative of the energy density with respect to the mask function. With the mask expressed in terms of a basis set, the derivative of the cost with respect to a basis set coefficient is conveniently obtained in a variationally consistent manner, which can then be used in fast optimization algorithms. For example, if a Fourier basis is used, $$\frac{\delta E}{\delta \tilde{m}(-f)} = \int d^2 r \frac{\delta \epsilon[m(r), p(r)]}{\delta m(r)} e^{-i2\pi f \cdot r}$$

In this case, all the derivatives may be calculated wholesale via fast Fourier transform (FFT) algorithms.

The present invention may use different forms of the cost functional, and these forms may be modified as the optimization proceeds. An example of a simple form that measures how well a mask is predicted to print a desired target is $$E = \int d^2 r (R[I(r)] - p(r))^2$$

where $I(r)$ is the projected intensity image (which is a functional of the mask), and R is a functional of the intensity that predicts the final developed resist pattern. In practice, more sophisticated cost functionals may be necessary or provide better results.

Without further direction, an optimized mask function will evaluate to transmission values that are not restricted to those allowed for a particular mask manufacturing process. Furthermore, some of the values may lie well outside the range allowed for passive transmission of light; for example, a mask cannot add energy by having a large region with a transmission coefficient of 2.

Figure 4:
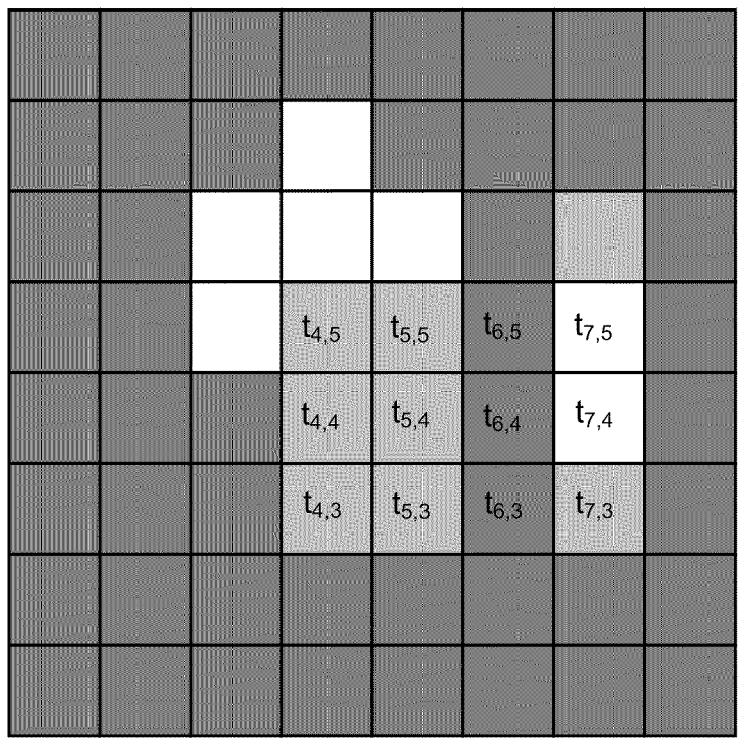
FIG. 4 schematically shows a mask represented as pixels comprising an image of transmission values.

To address the second of these issues, an embodiment of the present invention may add a regularizing term to the cost functional that penalizes a mask function that assumes values outside of the allowed range. As shown schematically in one dimension in FIG. 4, such a term can prevent large excursions beyond specified limits. An embodiment that exploits a spatial frequency analysis may use a larger frequency limit to provide for this "soft" clamping effect.

Figure 6:
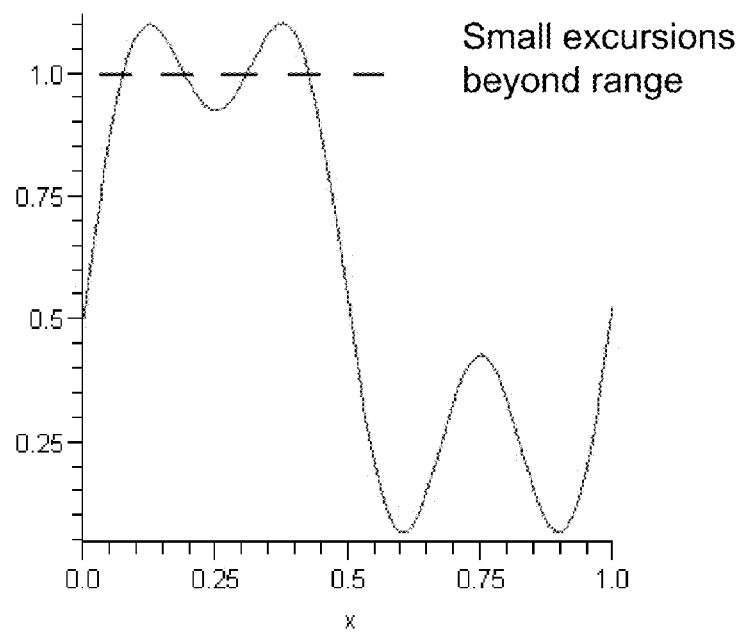
FIG. 6 schematically shows in one dimension a band-limited mask transmission function that has been regularized to avoid large excursions beyond the minimum and maximum allowable mask values.
Figure 7:
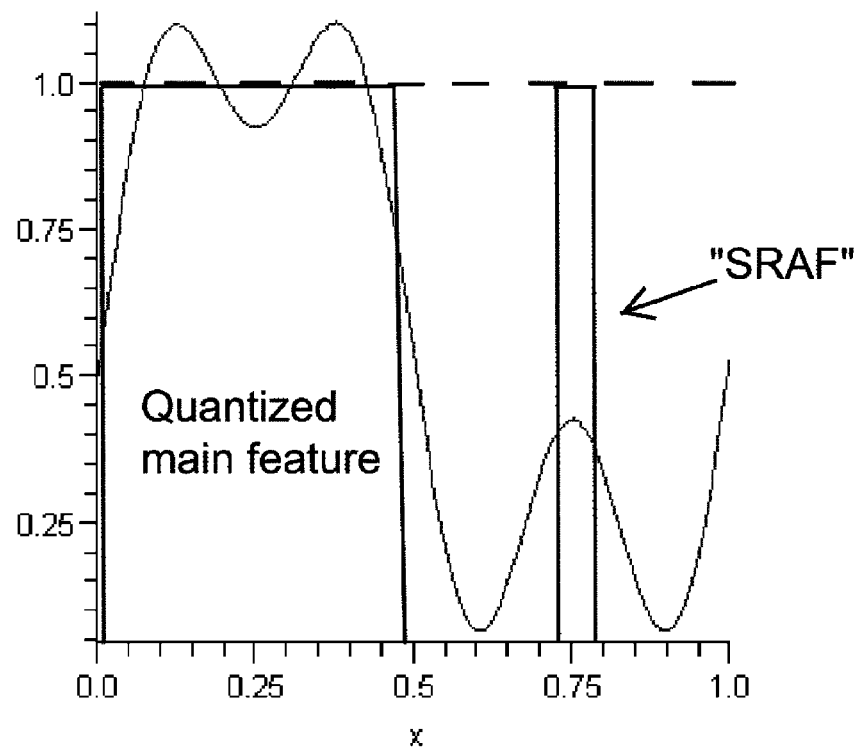
FIG. 7 schematically shows in one dimension a mask transmission function that has been further regularized to strongly favor allowable mask values.

Once a restricted optimized mask function has been found via cost minimization algorithms familiar to one skilled in the art, further regularization may be performed to quantize the mask to allowable values. The cost functional term may be mixed in on any schedule found to effective, and it's form may adjust as the regularization optimization proceeds. FIG. 7 shows the result from FIG. 6 after regularization to assume values of one or zero, as for a binary chrome-on-glass mask. Note how the area near x=0.75 of value<0.4 has transformed into an "SRAF" of full transmission value but width too narrow to print.

Once quantized, the mask may be transformed into geometry to be further regularized to satisfy geometric manufacturability criteria.

In an embodiment, the spatial locality of the optical projection process is used in addition to the frequency locality to enable the decomposition of a full mask into overlapping tiles in which the cost functional and functional derivatives may be evaluated in a manner consistent with handling the entire mask at once. The spatial localization means that there need not be any cross-tile matching conditions imposed on basis sets used to represent the mask function within each tile.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   partitioning a layout mask into a plurality of regions, each region comprising geometric shapes;
   generating a two-dimensional pixel representation of a region;
   generating an analytical function to represent the pixel representation of the region;
   performing a transformation on the analytical function to obtain a frequency space representation of the analytical function of the region; and
   based on the frequency space representation, removing, by a computer, low frequency components of the analytical function of the region.

2. The method of claim 1 wherein the removing is performed, at least in part, by a central processing unit (CPU) of the computer.

3. The method of claim 1 wherein the removing is performed, at least in part, by a graphics processing unit (GPU) of the computer.

4. The method of claim 1 comprising:
   after the removing the low frequency components, performing an inverse transformation to obtain a first finalized mask.

5. The method of claim 4 comprising:
   after performing the inverse transformation, generating subresolution assist features to obtain a second finalized mask.

6. The method of claim 1 wherein the layout mask is in a spatial space.

7. The method of claim 1 wherein the transformation uses a Fourier basis.

8. The method of claim 1 wherein the transformation uses a wavelet basis.

9. The method of claim 1 wherein the frequency space representation comprises frequencies up to a multiple of a cutoff frequency.

* * * * *